US012615140B2

(12) United States Patent
Lamas Linares et al.

(10) Patent No.: US 12,615,140 B2
(45) Date of Patent: Apr. 28, 2026

(54) QUANTUM SAFE ENCLAVES

(71) Applicant: Amazon Technologies, Inc., Seattle, WA (US)

(72) Inventors: Antia Lamas Linares, Austin, TX (US); Pavel Lougovski, Bellevue, WA (US); Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 594 days.

(21) Appl. No.: 17/548,422

(22) Filed: Dec. 10, 2021

(65) Prior Publication Data

US 2023/0188335 A1 Jun. 15, 2023

(51) Int. Cl.
*H04L 9/08* (2006.01)
*H04L 9/40* (2022.01)

(52) U.S. Cl.
CPC ........ *H04L 9/0858* (2013.01); *H04L 63/0428* (2013.01); *H04L 63/164* (2013.01); *H04L 63/166* (2013.01)

(58) Field of Classification Search
CPC ............. H04L 63/0272; H04L 63/0428; H04L 63/061; H04L 63/164; H04L 63/166; H04L 9/0852; H04L 9/0858; H04L 9/0894
See application file for complete search history.

(56) References Cited

U.S. PATENT DOCUMENTS

| | | | | |
|---|---|---|---|---|
| 7,457,416 B1 * | 11/2008 | Elliott | .................... | H04L 9/0852 |
| | | | | 380/278 |
| 7,460,670 B1 * | 12/2008 | Elliott | .................... | H04L 9/0858 |
| | | | | 709/224 |

| | | | | |
|---|---|---|---|---|
| 7,512,242 B2 * | 3/2009 | Pearson | ................. | H04L 9/0855 |
| | | | | 380/278 |
| 7,646,873 B2 * | 1/2010 | Lee | ........................ | H04L 9/0852 |
| | | | | 380/278 |
| 8,781,334 B2 | 7/2014 | Munro | | |
| 9,692,595 B2 * | 6/2017 | Lowans | ................ | H04L 9/0858 |
| 9,858,531 B1 | 1/2018 | Monroe | | |

(Continued)

FOREIGN PATENT DOCUMENTS

| | | |
|---|---|---|
| CN | 112332984 A | 2/2021 |

OTHER PUBLICATIONS

U.S. Appl. No. 18/605,642, filed Mar. 14, 2024, Mihir Keshav Bhaskar, et al.

(Continued)

*Primary Examiner* — Sharon S Lynch

(74) *Attorney, Agent, or Firm* — Alexander A. Knapp; Kowert, Hood, Munyon, Rankin & Goetzel, P.C.

(57) ABSTRACT

A system and method for establishing and using quantum safe enclaves is described. In some embodiments, secure shared randomness is distributed between nodes, for example using quantum key distribution. The secured shared randomness is used to generate quantum safe network keys that enable quantum safe network links to be established between any of the nodes included in the quantum safe enclave. A network manager enforces policies that restrict communications between nodes of the quantum safe enclave to transmission via quantum safe network links. Such an arrangement protects communicated data from quantum enabled attacks that may compromise other forms of encryption.

20 Claims, 14 Drawing Sheets

(56) References Cited

U.S. PATENT DOCUMENTS

| | | | | |
|---|---|---|---|---|
| 10,971,672 | B2 | 4/2021 | Olivadese | |
| 11,200,508 | B2 | 12/2021 | Reagor | |
| 11,288,587 | B2 | 3/2022 | Paik | |
| 11,456,867 | B2 * | 9/2022 | Schmatz | H04L 9/0891 |
| 11,477,017 | B2 * | 10/2022 | Newton | H04L 9/0869 |
| 11,641,242 | B1 | 5/2023 | Bhaskar | |
| 11,652,619 | B2 * | 5/2023 | Parry | H04L 9/0855 |
| | | | | 380/278 |
| 11,777,719 | B2 * | 10/2023 | Nix | H04L 9/0869 |
| | | | | 713/171 |
| 11,962,354 | B2 | 4/2024 | Bhaskar et al. | |
| 11,991,275 | B2 * | 5/2024 | Newton | H04L 9/0825 |
| 12,058,248 | B2 * | 8/2024 | Williams | H04L 9/0855 |
| 12,170,725 | B2 * | 12/2024 | Trost | H04L 9/0852 |
| 12,321,931 | B2 * | 6/2025 | Childe | G06Q 20/027 |
| 2004/0184603 | A1 * | 9/2004 | Pearson | H04L 9/0855 |
| | | | | 380/28 |
| 2006/0062392 | A1 * | 3/2006 | Lee | H04L 9/0852 |
| | | | | 380/278 |
| 2007/0130455 | A1 * | 6/2007 | Elliott | H04L 9/0858 |
| | | | | 713/150 |
| 2012/0177201 | A1 * | 7/2012 | Ayling | H04L 9/0858 |
| | | | | 380/278 |
| 2013/0251145 | A1 * | 9/2013 | Lowans | H04L 9/0891 |
| | | | | 380/44 |
| 2020/0328886 | A1 * | 10/2020 | Newton | H04L 9/0819 |
| 2020/0396067 | A1 | 12/2020 | Barker | |
| 2021/0105135 | A1 | 4/2021 | Figueroa | |
| 2021/0126781 | A1 * | 4/2021 | Schmatz | H04L 9/3268 |
| 2021/0176055 | A1 | 6/2021 | Rahman | |
| 2021/0250339 | A1 * | 8/2021 | Chumura | H04L 9/14 |
| 2021/0342729 | A1 | 11/2021 | Scheer | |
| 2022/0026195 | A1 | 1/2022 | Fertig | |
| 2022/0294616 | A1 * | 9/2022 | Parry | H04L 9/0855 |
| 2023/0006981 | A1 * | 1/2023 | Syrivelis | H04L 9/0852 |
| 2023/0020193 | A1 * | 1/2023 | Williams | H04L 9/0825 |
| 2023/0188548 | A1 | 6/2023 | Bhaskar et al. | |
| 2023/0224148 | A1 * | 7/2023 | Newton | H04L 9/0819 |
| | | | | 380/278 |
| 2023/0327780 | A1 | 10/2023 | Bhaskar et al. | |
| 2023/0360040 | A1 * | 11/2023 | Childe | G06Q 20/0655 |
| 2024/0073004 | A1 * | 2/2024 | Burns | H04L 9/0861 |
| 2024/0113869 | A1 * | 4/2024 | Trost | H04L 9/0852 |
| 2024/0187219 | A1 * | 6/2024 | Childe | H04L 9/14 |

OTHER PUBLICATIONS

Gundogan et al., "Space-borne quantum memories for global quantum communication," arxiv.org, Jun. 18, 2020, pp. 1-11, Cornell University Library, Ithaca, NY.

Sumeet Khatri, et al., "Spooky action at a global distance: analysis of space-based entanglement distribution for the quantum internet," arxiv.org, Jan. 11, 2021, pp. 1-22, Cornell University Library, Ithaca, NY.

International Search Report and Written Opinion mailed Oct. 20, 2023 in PCT/US2022/080911, Amazon Technologies, Inc., pp. 1-9.

Li Zhonghui et al: "Building a large-scale and wide-area quantum Internet based on an OSI-alike model", China Communications, China Institute of Communications, Nov. 2, 2021, pp. 1-14, vol. 18, No. 10, Piscataway, NJ, USA.

K. Boone, et al., "Entanglement over global distances via quantum repeaters with satellite links," arXiv preprint: arXiv:1410.5384v1 [quant-ph] 2014, pp. 1-8.

Jasminder S. Sidhu, et al., "Advances in Space Quantum Communications," IET Research Journals, © The Institution of Engineering and Technology 2015, pp. 1-26.

Sheng-Kai Liao, et al. "Satellite-relayed intercontinental quantum network," Physical Review Letters 120, 030501 (2018), pp. 1-4.

Mustafa Gundoğan, et al., "Proposal for space-borne quantum memories for global quantum networking," www.nature.com/npjqi, npj Quantum Information vol. 7, Article No. 128 (2021), pp. 1-10.

M. K. Bhaskar, et al., "Experimental demonstration of memory-enhanced quantum communication," Nature | vol. 580 | 2020, pp. 60-76.

Boone et al, "Entanglement over global distances via quantum repeaters with satellite links", Physical Review A 91 (2015), arXiv:1410. 5384 [quant-ph], pp. 1-8.

Sidhu et al, "Advances in Space Quantum Communications", IET Research Journals, arXiv:2103.12749 (2021), pp. 1-26.

Gundogan et al, "Proposal for space-borne quantum memories for global quantum networking," NPJ Quantum Information 7:128 (2021), pp. 1-10.

Pirandola, "Satellite quantum communications: Fundamental bounds and practical security", Physical Review Research 3, 023130 (2021), Published by the American Physical Society, pp. 1-29.

Harney and Pirandola, "Optimal Performance of Global Quantum Networks", arXiv:2104.10701 (2021), pp. 1-14.

Liao et al, "Satellite-Relayed Intercontinental Quantum Network," Physical Review Letters 120, 030501 (2018), arXiv:1801.04418 [quant-ph], pp. 1-10.

U.S. Appl. No. 17/548,254, filed Dec. 10, 2021, Mihir Keshav Bhaskar, et al.

U.S. Appl. No. 17/548,418, filed Dec. 10, 2021, Mihir Keshav Bhaskar, et al.

U.S. Appl. No. 18/309,247, filed Apr. 28, 2023, Mihir Keshav Bhaskar, et al.

U.S. Appl. No. 18/478,794, filed Sep. 29, 2023, Mihir Keshav Bhaskar, et al.

U.S. Appl. No. 18/478,809, filed Sep. 29, 2023, Mihir Keshav Bhaskar, et al.

* cited by examiner

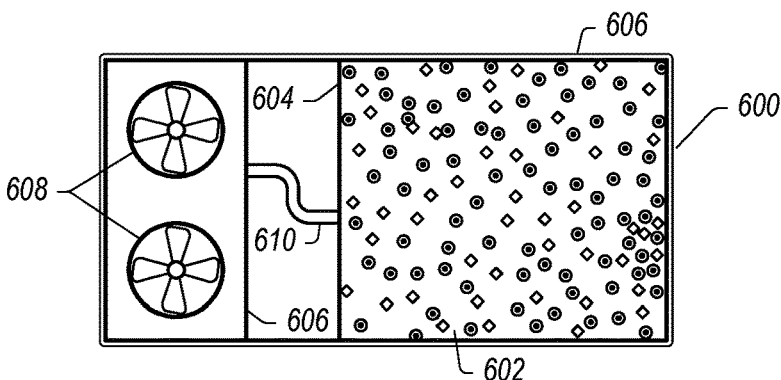
*FIG. 6A*
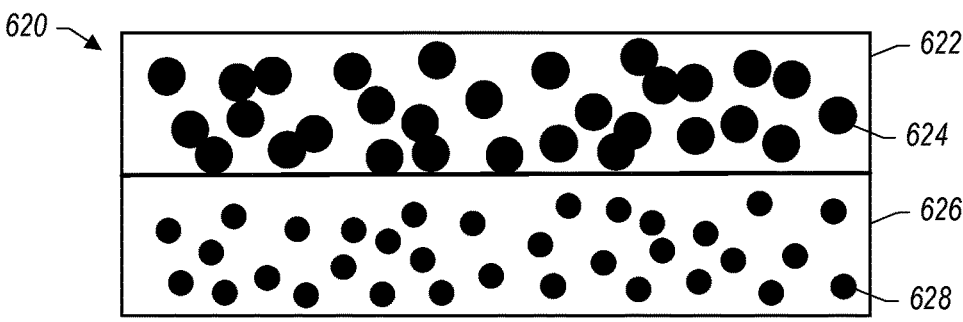
*FIG. 6B*
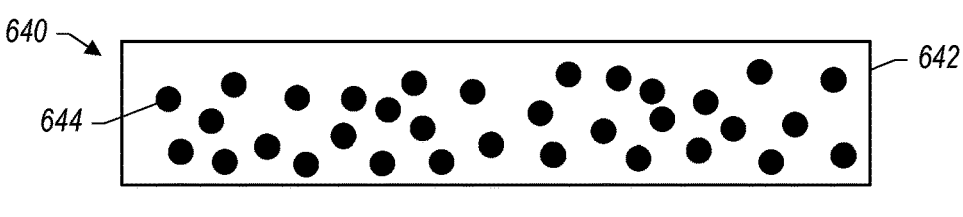
*FIG. 6C*
660 ⟍
| Durable Outer Layer — 670 |
| Anti-Tamper Layer |
| Shock Absorbent Inner Layer — 668 |
662
664
*FIG. 6D*

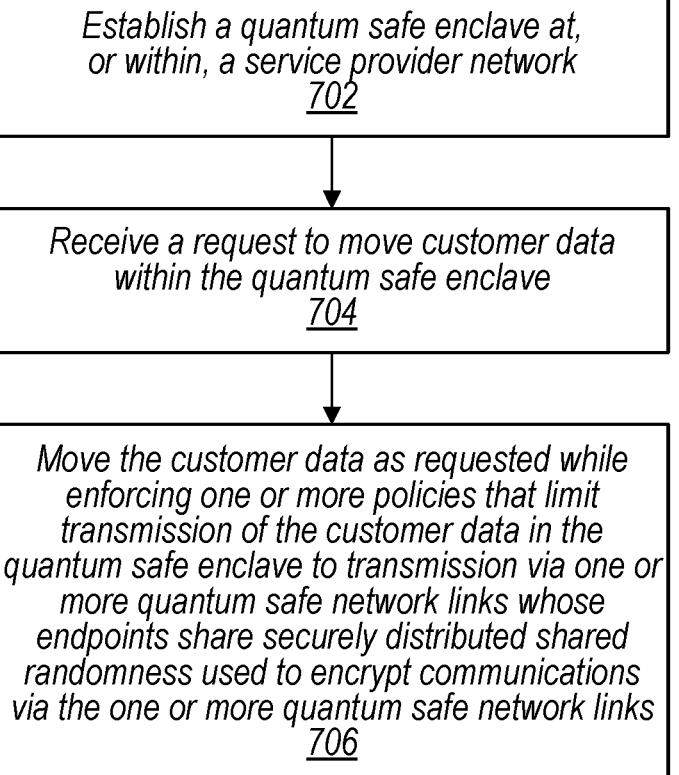

Establish a quantum safe enclave at,
or within, a service provider network
702

Receive a request to move customer data
within the quantum safe enclave
704

Move the customer data as requested while
enforcing one or more policies that limit
transmission of the customer data in the
quantum safe enclave to transmission via one or
more quantum safe network links whose
endpoints share securely distributed shared
randomness used to encrypt communications
via the one or more quantum safe network links
706

FIG. 7

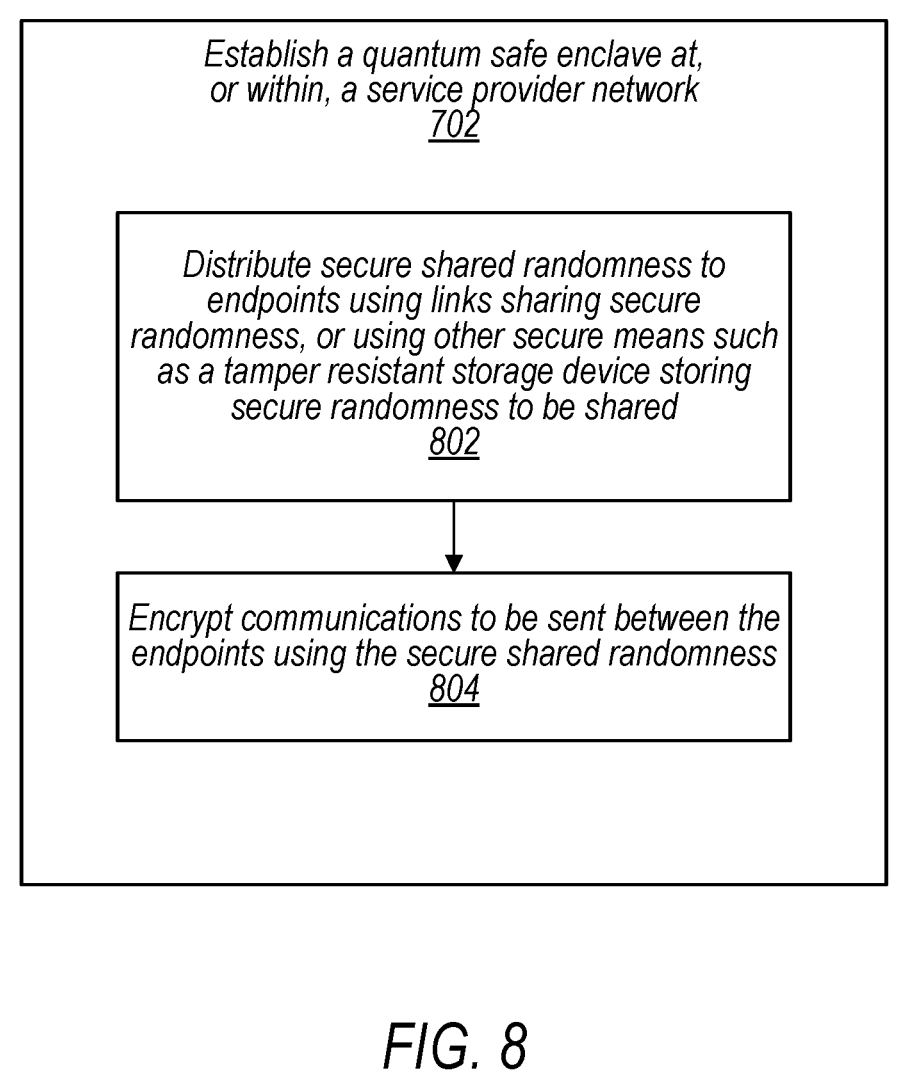

Establish a quantum safe enclave at,
or within, a service provider network
702

Distribute secure shared randomness to
endpoints using links sharing secure
randomness, or using other secure means such
as a tamper resistant storage device storing
secure randomness to be shared
802

Encrypt communications to be sent between the
endpoints using the secure shared randomness
804

FIG. 8

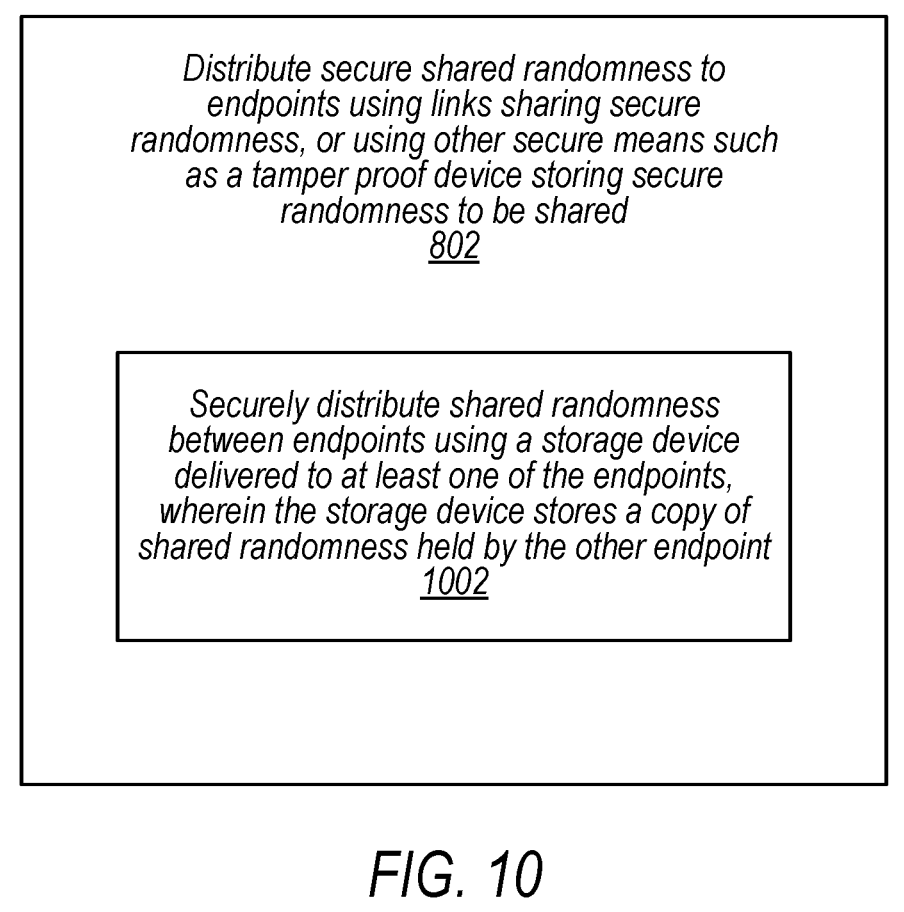

Distribute secure shared randomness to
endpoints using links sharing secure
randomness, or using other secure means such
as a tamper proof device storing secure
randomness to be shared
802

Securely distribute shared randomness
between endpoints using a storage device
delivered to at least one of the endpoints,
wherein the storage device stores a copy of
shared randomness held by the other endpoint
1002

FIG. 10

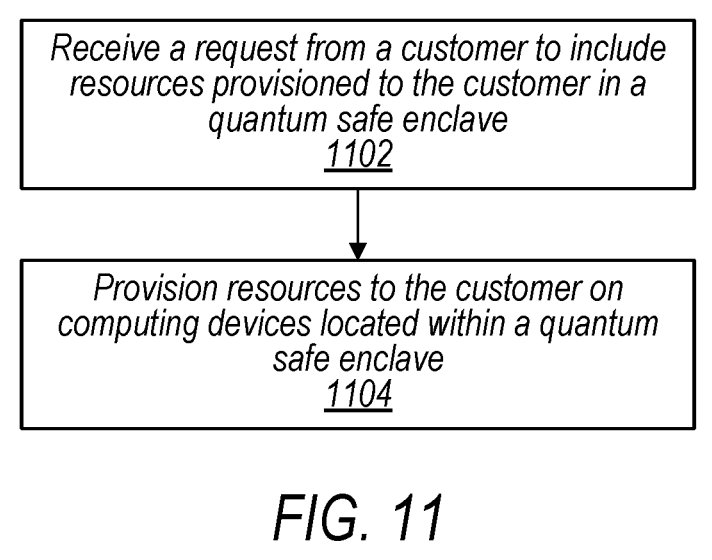

```
┌──────────────────────────────────────┐
│ Receive a request from a customer to include │
│  resources provisioned to the customer in a  │
│           quantum safe enclave               │
│                  1102                        │
└──────────────────────────────────────┘
                    │
                    ▼
┌──────────────────────────────────────┐
│   Provision resources to the customer on     │
│ computing devices located within a quantum   │
│              safe enclave                    │
│                  1104                        │
└──────────────────────────────────────┘
```

*FIG. 11*

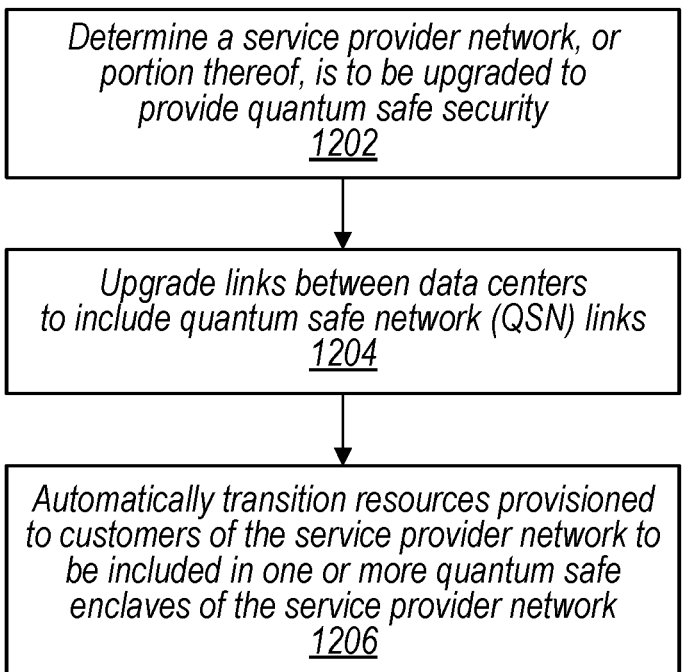

Determine a service provider network, or
portion thereof, is to be upgraded to
provide quantum safe security
1202

Upgrade links between data centers
to include quantum safe network (QSN) links
1204

Automatically transition resources provisioned
to customers of the service provider network to
be included in one or more quantum safe
enclaves of the service provider network
1206

FIG. 12

QUANTUM SAFE ENCLAVES

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects (e.g., particles) like photons, molecules, atoms, and electrons.

A quantum computing device is a device that utilizes quantum mechanics to allow one to write, store, process and read out information encoded in quantum states, e.g., the states of quantum objects. A quantum object is a physical object that behaves according to the laws of quantum physics. The state of a physical object is a description of the object at a given time.

In quantum mechanics, the state of a two-level quantum system, or simply, a qubit, is a list of two complex numbers, where the absolute sum of the complex numbers must sum to one. Each of the two numbers is called an amplitude, or quasi-probability. The square of an amplitude gives a potentially negative probability. Hence, each of the two numbers correspond to the square root that event zero and event one will happen, respectively. A fundamental and counterintuitive difference between a probabilistic bit (e.g., a traditional zero or one bit) and the qubit is that a probabilistic bit represents a lack of information about a two-level classical system, while a qubit contains maximal information about a two-level quantum system.

Quantum computing devices are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

Public networks often rely on public key distribution mechanisms that have a security foundation based on the assumption that certain mathematical problems, e.g., integer factoring, cannot be solved efficiently. If these assumptions do not hold, such security is critically weakened. The advancement of quantum computers that can efficiently solve the factoring problem is an example of a cryptographic threat to such communications.

BRIEF DESCRIPTION OF THE DRAWINGS

FIG. 6A illustrates an example tamper-resistant storage device that may be used to distribute secure shared randomness, according to some embodiments.

FIGS. 6B-6D illustrate example structures that may be used to provide tamper resistance for the tamper-resistant storage device used to distribute secure shared randomness, according to some embodiments.

FIG. 7 is a flowchart illustrating a process of establishing and enforcing a quantum safe enclave, according to some embodiments.

FIG. 8 is a flowchart illustrating additional details regarding a process for establishing a quantum safe enclave, according to some embodiments.

FIG. 10 is a flowchart illustrating additional details regarding another example process for distributing secure shared randomness in order to establish a quantum safe enclave, according to some embodiments.

FIG. 11 is an example flow diagram for a process of providing customer access to a quantum safe enclave, according to some embodiments.

FIG. 12 is an example flow diagram for another process of providing customer access to a quantum safe enclave, according to some embodiments.

Figure 1:
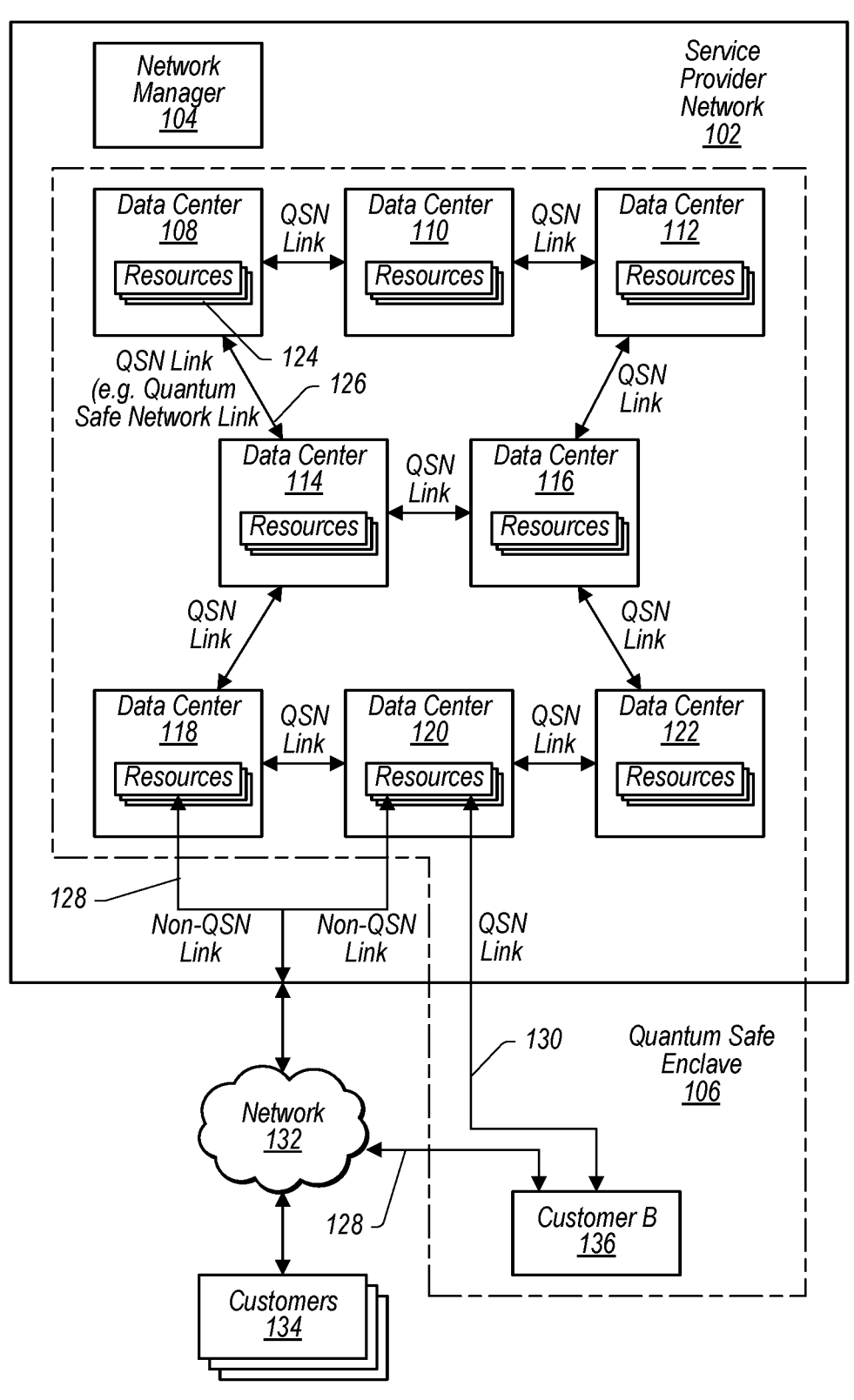
FIG. 1 illustrates a service provider network comprising quantum safe network links that implement a quantum safe enclave, also a quantum safe network link is extended out of the service provider network to a customer resource to include the customer resource in the quantum safe enclave, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and systems for establishing and maintaining quantum safe enclaves. A quantum safe enclave comprises computing and/or data storage resources that are connected via quantum safe network links. The quantum safe network links are established using key distribution mechanisms that are protected against eavesdropping or alterations of communications. These securely distributed keys, which may also be referred to as secure shared randomness, are used to encrypt communications communicated via the quantum safe network links. In some embodiments, quantum key distribution (QKD) is used to establish quantum safe network links between directly connected facilities, such as data centers of a service provider network or customers with direct connections to data centers of a service provider network. Established quantum safe network links between directly connected data centers, which may also be referred to as quantum key distribution (QKD) links, are then used to propagate secure shared randomness (e.g., symmetric encryption keys) to non-directly connected data centers that are connected via one or more intermediate data centers connected with one another via quantum safe network links (e.g., QKD links).

In some embodiments, quantum safe network links are established by distributing secure shared randomness (e.g., random bits that can be used as encryption material) to both parties at ends of a conventional link that is to be used to establish a quantum safe network link. In some embodiments, the secure shared randomness may be distributed in a secure way using quantum entanglement or other secure quantum distribution mechanisms. For example, both parties at the ends of the link may be distributed respective particles that are quantum entangled. Measurements may be performed by both parties using the entangled particles to generate bits of secure shared randomness. Because both parties hold the entangled particles, the bits determined by each party via the measurements of the entangled particles will be the same, or one party can determine the bit measured by the other. However, the physical properties of the quantum entangled particles prevent any third-party from intercepting the bits being communicated without the parties holding the entangled particles being made aware of the third-party attempt to intercept the communication. In this way, random information can be shared between the two parties holding the entangled particles in a secure way that prevents interception or alteration by others.

Using distributed entangled particles to distribute secure shared randomness (e.g., encryption keys) is an example of quantum key distribution (QKD). As mentioned above, secure QKD links established between facilities for which it is possible to share quantum entanglement may be used to establish quantum safe network links between other facilities for which it is not possible to directly share quantum entanglement. For example, additional quantum safe network links between facilities that do not share quantum entanglement may be established via the QKD links established between facilities that are capable of sharing quantum entanglement. The additional quantum safe network links may be established using encapsulated communications via the already established QKD links. For example, consider three data centers, data center A, data center B, and data center C, wherein data center B is a middle data center that is connected to data centers A and C on either side of the middle data center, data center B, via QKD links. Thus, there is a QKD link between data center A and data center B and another QKD link between data center B and data center C. However, there is no direct QKD link between data center A and data center C. In such a situation, a quantum safe network link may be established between data center A and data center C via key propagation and encapsulation. For example, data center A may send secure shared randomness to data center C via the intermediate QKD links between data center A and B and between data center B and C, wherein secure shared randomness shared between the respective data centers sharing QKD links (e.g., data centers A and B and data centers B and C) is used to encrypt the secure shared randomness being sent to data center C from data center A when traversing the respective intermediate QKD links from A to B and from B to C.

In some embodiments, an alternative method of distributing secure shared randomness for use in establishing a quantum safe network link, may be using a tamper-resistant storage device to provide the secure shared randomness. For example, a customer of a service provider network may request to have a quantum safe enclave extended to the customer's endpoint. In some embodiments, the service provider network may generate encryption key material, e.g., secure shared randomness and store a copy of the encryption key material in a tamper-resistant storage device, which may be sent to the customer requesting extension of the quantum safe enclave. The stored encryption key material may be used by the customer to encrypt and decrypt communications sent or received from the service provider network. In order to prevent the encryption key material from being compromised, the customer or service provider may limit the encryption key material to a one-time use. For example, if 100 bits of data are used for encryption and the storage device stores 1 MB of encryption material, then the customer may have sufficient encryption material for approximately 10,000 one-time pads of 100 bits each. Note that the above example is given for simplicity, in various embodiments the bits of encryption and the overall amount of encryption material stored in a tamper resistant storage device may vary considerably.

Note that quantum safe network links, as described herein, use secret symmetric encryption keys. These keys are distributed in a way in which the security of the distribution does not rely on assumptions about computational complexity, but is instead based on the physical properties of quantum systems or the secure distribution of information using tamper-resistant storage devices.

At the hardware layer, quantum key distribution (QKD) works between any two network points with access to a communication channel that supports transmission of quantum-level optical signals, e.g., an optical fiber or a free-space (satellite) link. To establish a symmetric key, one of the parties generates a random classical bit and encodes it into a quantum state of a photon. When the second party receives the photon, it measures the photon's state, randomly choosing its measurement basis. The laws of quantum mechanics dictate that if the second party guesses the measurement basis correctly (i.e., guesses the encoding basis) then the two parties will end up with the same random classical bit. Any attempt by a malicious third party to intercept and learn the quantum state of transmitted photons will result in excess channel noise detectable by the communicating parties, prompting the parties to re-start the process. Quantum safe enclaves use this shared randomness with existing cryptographic infrastructure, providing a QKD-enabled end-to-end quantum-safe cryptography solution. In some embodiments, secure shared randomness (e.g., QKD keys) are distributed to data centers with a combination of fiber and satellite links. These keys are available for customer use and are also used to encrypt inter-data-center links. This protects customers against record and decrypt attacks in which a malicious party taps a communication channel, records the encrypted communications and waits for sufficiently advanced technology to be available for decryption.

In some embodiments, post quantum cryptography (PQC) is used for communication channels within a data center at a trusted service provider network site. Post-quantum cryptography (PQC) uses classical encryption algorithms that are believed to be resistant against attacks by quantum computers. In contrast, QKD enables the generation and sharing of a secret random number (key) in a quantum-safe manner using the physical properties of quantum systems. PQC security is based on the difficulty of solving a mathematical problem providing what is known as "computational security". QKD security is based on "information theoretic security", that is, there are no underlying assumptions on the computational capabilities (whether classical or quantum) of current or future hardware. The two technologies complement and augment each other in the context of quantum security and may both be used to implement portions of a quantum safe enclave. For example, QKD is used to distribute secure symmetric keys over channels that are outside the secure perimeters of a data center. PQC, being software based, is used for cryptographic tasks in complex topologies such as inside a data center running virtualized computing or storage instances. Combining the two technologies provides protection against developments in cryptoanalysis and results in a more resilient, as well as quantum-safe, cryptographic stack.

In some embodiments, secure shared randomness distributed via quantum safe network links is used to supply symmetric keys to other encryption protocols, such as transport layer security (TLS), internet protocol security (IPSec), media access control security (MacSec), virtual private networks (VPNs), etc. Many of these protocols already have a built in pre-shared key (PSK) mechanism that can take advantage of secure shared randomness distributed via quantum safe network links of a quantum safe enclave.

FIG. 1 illustrates a service provider network comprising quantum safe network links that implement a quantum safe enclave, also a quantum safe network link is extended out of the service provider network to a customer resource to include the customer resource in the quantum safe enclave, according to some embodiments.

In some embodiments, a quantum safe enclave, such as quantum safe enclave 106, is established using quantum safe network links, such as quantum safe network (QSN) links 126, which connect data centers 108, 110, 112, 114, 116, 118, 120, and 122 of service provider network 102. Additionally, in some embodiments, a customer, such as customer 136 may be connected to a data center of a service provider network, such as data center 120 via QSN link 130. In some embodiments, data centers 108, 110, 112, 114, 116, 118, 120, and 122 include resources 124, which may include various types of resources that may be allocated for use by customers 134, such as virtualized computing or storage resources, bare metal computing resources, other services, such as networking services, machine learning services, database services, etc.

In some embodiments, network manager 104 causes QSN links 126 to be established using various methods as further described herein. Additionally, network manager 104 is configured to enforce one or more policies that limit communications to or from computing or data storage resources within a quantum safe enclave, such as quantum safe enclave 106, to transmission via respective ones of the quantum safe network links 126. For example, data stored in resources 124 in data center 120 that are included in quantum safe enclave 106 may not be permitted to be transmitted via a public network, such as network 132, and instead may be transmitted via QSN link 130 to customer 136. Alternatively, in some embodiments, customer 136 and resources 124 in data center 120 may exchange secure shared randomness (e.g., encryption material) via a quantum secure mechanism to establish QSN link 130 that is within quantum safe enclave 106. Also, the exchanged secure shared randomness may be used to generate one time encryption keys used to encrypt customer data to be sent via network 132. For example, in some embodiments, there may be greater capacity on network 132 to transmit data than is available via QSN link 130. Thus, a QSN link, such as QSN link 130, may be used to exchange symmetric encryption keys, and then the higher capacity non-QSN links 128 may be used to transmit quantum safe encrypted data.

In some embodiments, quantum key distribution (QKD) is used to establish QSN links between adjacent data centers. Also, within a given data center post quantum cryptography (PQC) may be used to distribute secure shared randomness within the data center between a connection to the QKD link and a given resource within the data center, such as a compute or storage resource. The distributed secure shared randomness may then be used by the given resource to encrypt communications to be sent over non-QSN links 128, such as between customer B (136) and resources in data centers 118 or 120, via network 132. The distributed secure shared randomness may then be used to create an effective quantum safe network (QSN) channel via the non-QSN links 128.

Figure 2:
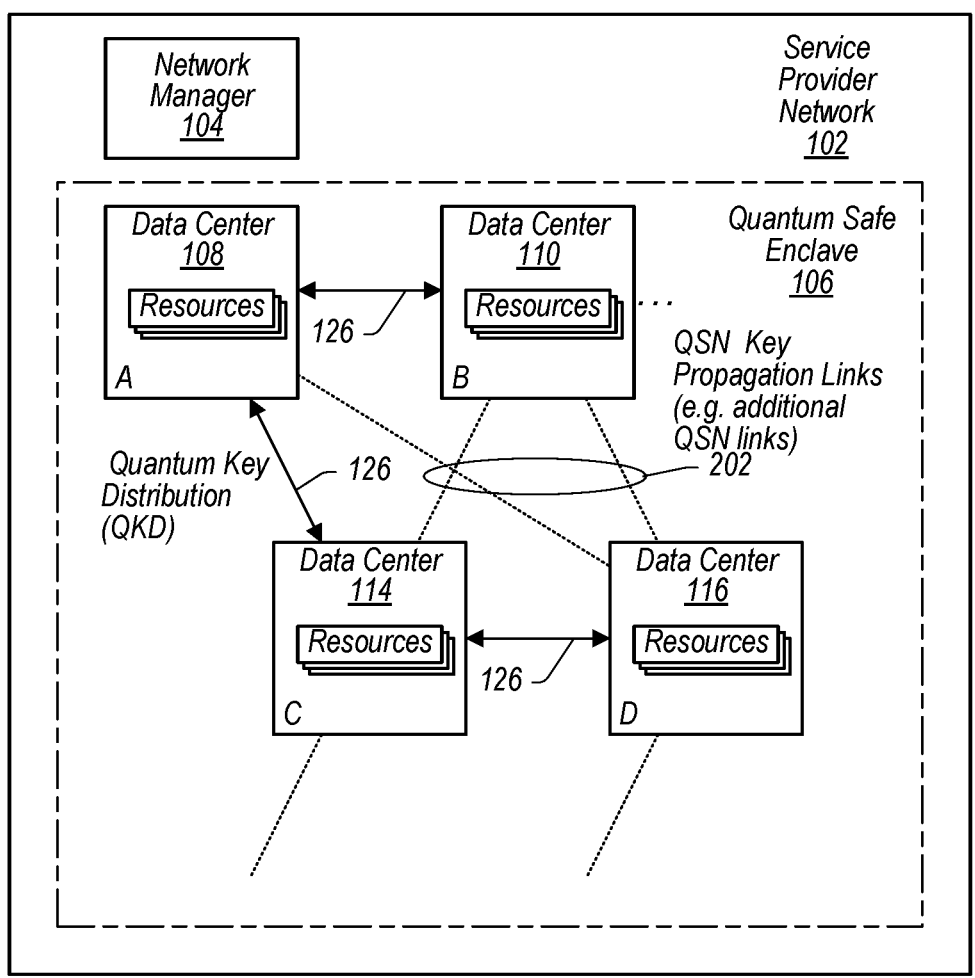
FIG. 2 illustrates additional details regarding quantum safe network links established via quantum key distribution (QKD) between directly connected data centers and other quantum safe network links that are established via key propagation using the quantum safe network links established via QKD, according to some embodiments.

FIG. 2 illustrates additional details regarding quantum safe network links established via quantum key distribution (QKD) between directly connected data centers and other quantum safe network links that are established via key propagation using the quantum safe network links established via QKD, according to some embodiments.

As described above, in some embodiments, QSN links 126 between directly connected data centers may be established using quantum key distribution, which involves sharing entangled quantum particles between respective endpoints at the directly connected data centers. However, secure QSN links between non-directly connected data centers may be established using encryption key propagation via previously established QSN/QKD links. For example, as shown in FIG. 2, QSN key propagation links 202 may be established between any of data centers A, B, C, and D using key propagation over QKD links 126 that connect data center A to data center B, that connect data center A to data center C, and that connect data center C to data center D.

In some embodiments, each of data centers A, B, C, and D may be considered a network site. In some embodiments, a network site is a geographically compact physical infrastructure with a strict physical security perimeter and controlled access. For example, a data center, transit center, or a collection of buildings can serve as a network site. Also, in some embodiments, network sites are connected via network links. A network link is typically a fiber or freespace channel connection connecting and carrying information between two distinct network sites. A network link end point is within the secure area of the network site. In some embodiments, a trusted node, such as may be included in quantum safe enclave 106, is a network site trusted to perform encryption/decryption/storage of incoming/outgoing traffic, such as any of data centers 108, 110, 112, 114, 116, 118, 120, and 122. In some embodiments, quantum key distribution comprises establishing symmetric encryption key pairs between two remote parties. By construction, the QKD key pairs are secure against attacks by malicious parties with unlimited classical and quantum computing resources. A QKD link, used in quantum key distribution, comprises a physical quantum communications link (fiber or free-space) between two parties equipped with QKD terminals. QKD links are used for establishing symmetric QKD key pairs between two parties. A quantum safe network link, as referred to herein, is a network link that is encrypted with an algorithm that is presumed to be quantum-safe using QKD-derived keys. In some embodiments, AES-256 or other suitable encryption algorithms may be used.

In some embodiments, quantum safe network links and/or QKD links, such as quantum safe network links 126 that include QKD links between data centers 108, 110, 114, and 116, and QSN key propagation links 202 between the data centers 108, 110, 114, and 116 may form a quantum key distribution mesh. A QKD mesh is a set of trusted network sites (trusted nodes) connected by QKD links in a simply connected network. This topology of QKD links and the trusted nature of the links allows the establishment of pair-wise symmetric QKD keys between any two network sites in the mesh. A quantum safe enclave, such as quantum safe enclave 106, may comprise a network where any subset of devices can establish QKD-derived quantum-safe encryption keys. Specifically, link encryptors on the communication lines between network sites can use the QKD keys to make all links external to the network sites into quantum-safe links.

In some embodiments, nodes on a QKD Mesh are filled with QKD keys created over QKD links. For the mesh nodes that are not directly connected via physical QKD links, the keys are generated at the nodes and are transmitted by using a sequence of one-time-pad encryptions. Each mesh node can decrypt an arriving key and re-encrypt it with its shared QKD-secure key for retransmission to the next mesh node until the original key reaches its destination. In this way a fully connected graph of trusted nodes is obtained, where each edge is sharing the shared key between them. A quantum safe enclave is established by connecting a set of network sites with a QKD mesh and using the pair wise keys to encrypt all communication links between the network sites with a quantum safe algorithm such as AES-256. In some embodiments, this is done by link encryptors, either using MACsec or directly at a layer 2 network. Once these communication links between network sites are encrypted, all communication between sites is quantum-safe in a transparent manner to the users of the infrastructure.

Figure 3:
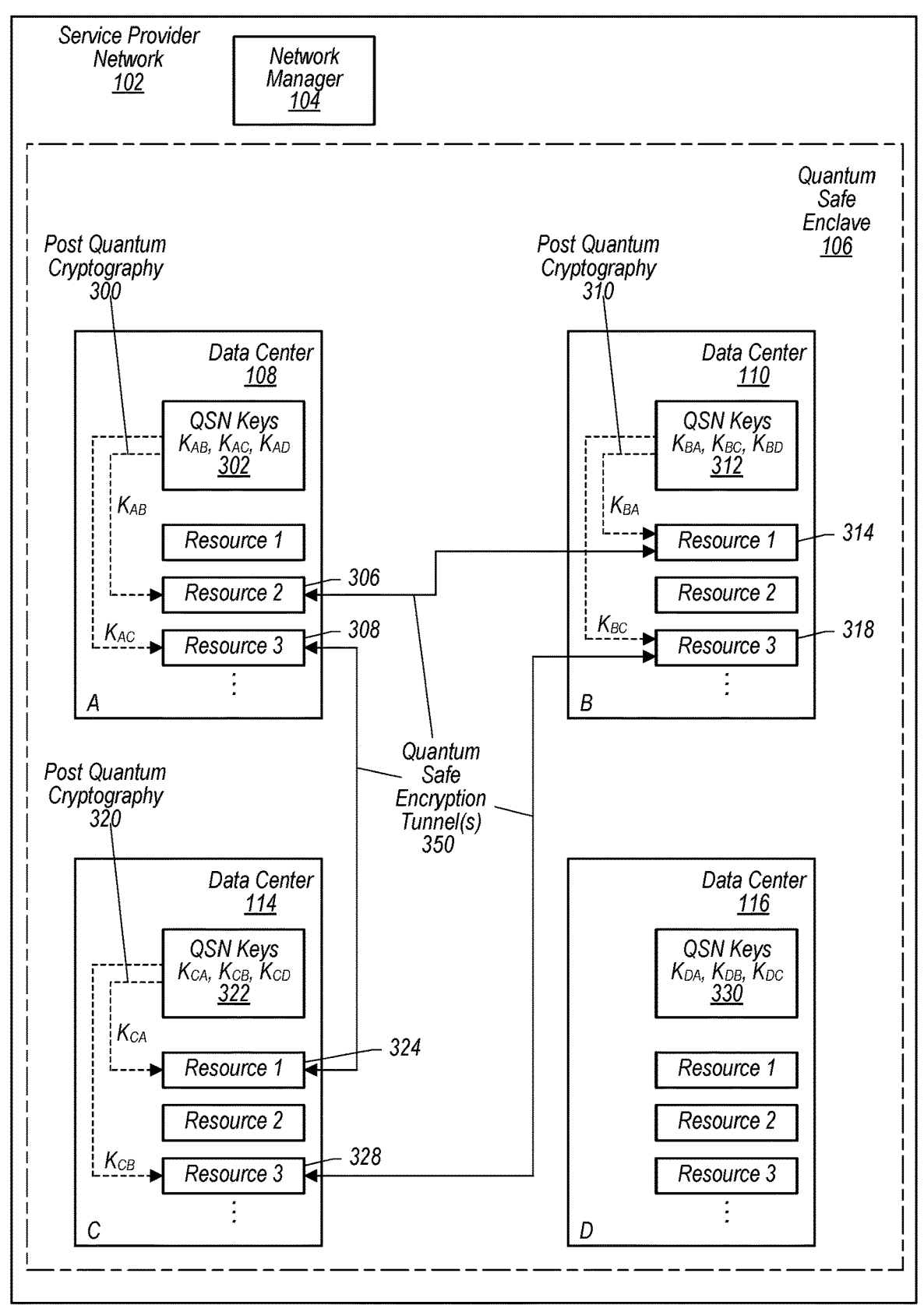
FIG. 3 illustrates additional details regarding quantum safe network links that are extended to resources within a data center using post quantum cryptography (PQC), according to some embodiments.

FIG. 3 illustrates additional details regarding quantum safe network links that are extended to resources within a data center using post quantum cryptography (PQC), according to some embodiments.

In some embodiments, at a given trusted node, such as data centers 108, 110, 114, and 116 (for simplicity referred to in the following discussion as data centers A, B, C, and D), QSN keys may be stored at a main location, such as locations 302, 312, 322, and 330, respectively in data centers A, B, C, and D. As can be seen each data center main location may store keys for communicating with other ones of the data centers. For example, data center A holds a key for communication with data center B ($K_{AB}$), a key for communicating with data center C ($K_{AC}$), and a key for communicating with data center D ($K_{AD}$). In some embodiments, a given resource in a given data center may wish to communicate with another given resource in another given data center in a quantum safe manner. For example, resource 306 of data center A may request to communicate with resource 314 of data center B. In such a situation, key $K_{AB}$ may be provided to resource 306 from main key storage location 302 of data center A using post quantum cryptography 300. Likewise, at data center B, key $K_{BA}$ may be provided to resource 314 from main key storage location 312 using post quantum cryptography 310. Once both resource 306 at data center A and resource 314 at data center B have the appropriate keys (e.g., keys $K_{AB}$ and $K_{BA}$) that were distributed using quantum safe network links/QKD links, resources 306 and 314 may encrypt and decrypt communications in a quantum safe manner. For example, the resources may communicate via a quantum safe encryption tunnel 350.

In a similar manner, resource 308 of data center A and resource 324 of data center C may communicate via quantum safe encryption tunnels 350 using respective keys provided from main key storage locations 302 and 322 via post quantum cryptography 300 and 320. Additionally, resource 328 of data center C and resource 318 of data center B may communicate using quantum safe encryption tunnels 350, in a similar manner.

In some embodiments, various post quantum cryptography protocols, which may be public-key algorithms, are used to encrypt communications within a trusted node. The post quantum cryptography (PQC) algorithms are designed to be secure against a cryptanalytic attack by a quantum computer.

Figure 4:
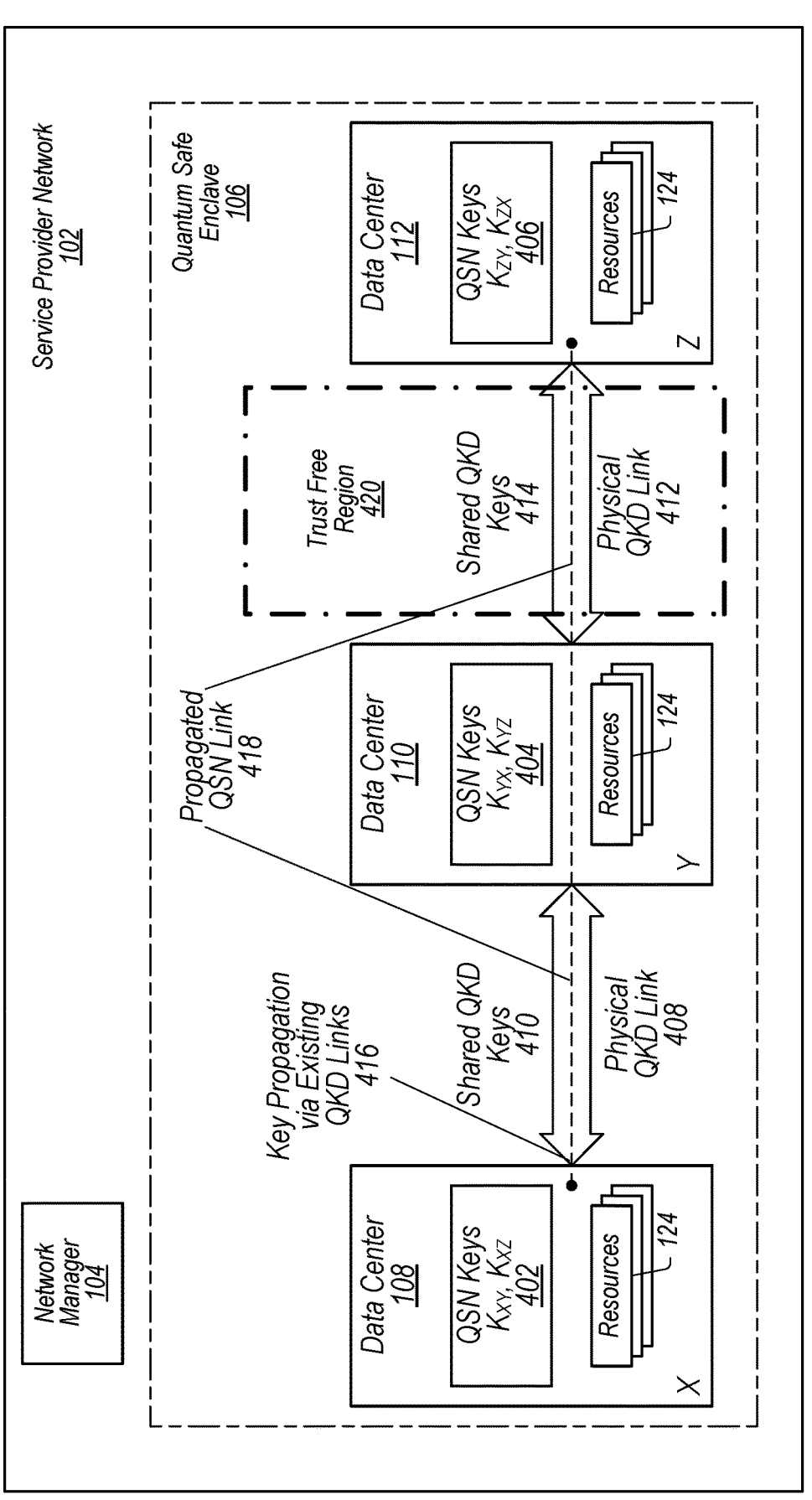
FIG. 4 illustrates additional details regarding key propagation between non-directly connected data centers in order to establish quantum safe network (QSN) links between the non-directly connected data centers, according to some embodiments.

FIG. 4 illustrates additional details regarding key propagation between non-directly connected data centers (e.g. data centers not having QKD links directly connecting the data centers) in order to establish quantum safe network (QSN) links between the non-directly connected data centers, according to some embodiments.

In some embodiments, physical QKD links, such as QKD links 408 and 412 may be used to exchange shared QKD keys 410 and 414 between directly connected data centers such as data centers X and Y (e.g., data center 108 and data center 110) and data centers Y and Z (e.g., data center 110 and data center 112). The shared QKD keys may then be used to propagate keys between non-directly connected data centers. For example, data center X and Z may exchange keys $K_{XZ}$ and $K_{ZX}$ via QKD links 408 and 412 to establish propagated QSN link 418 between data centers X and Z.

In some embodiments, physical QKD links, such as physical QKD link 412, may pass through a trust-free region, such as trust-free region 420, between data centers, such as between data centers 110 and 112. However, due to the physical nature of the distributed entanglement used to establish the QKD link, such links may be protected from attack even if passing through trust-free regions beyond the control of the service provider network 102.

Figure 5A:
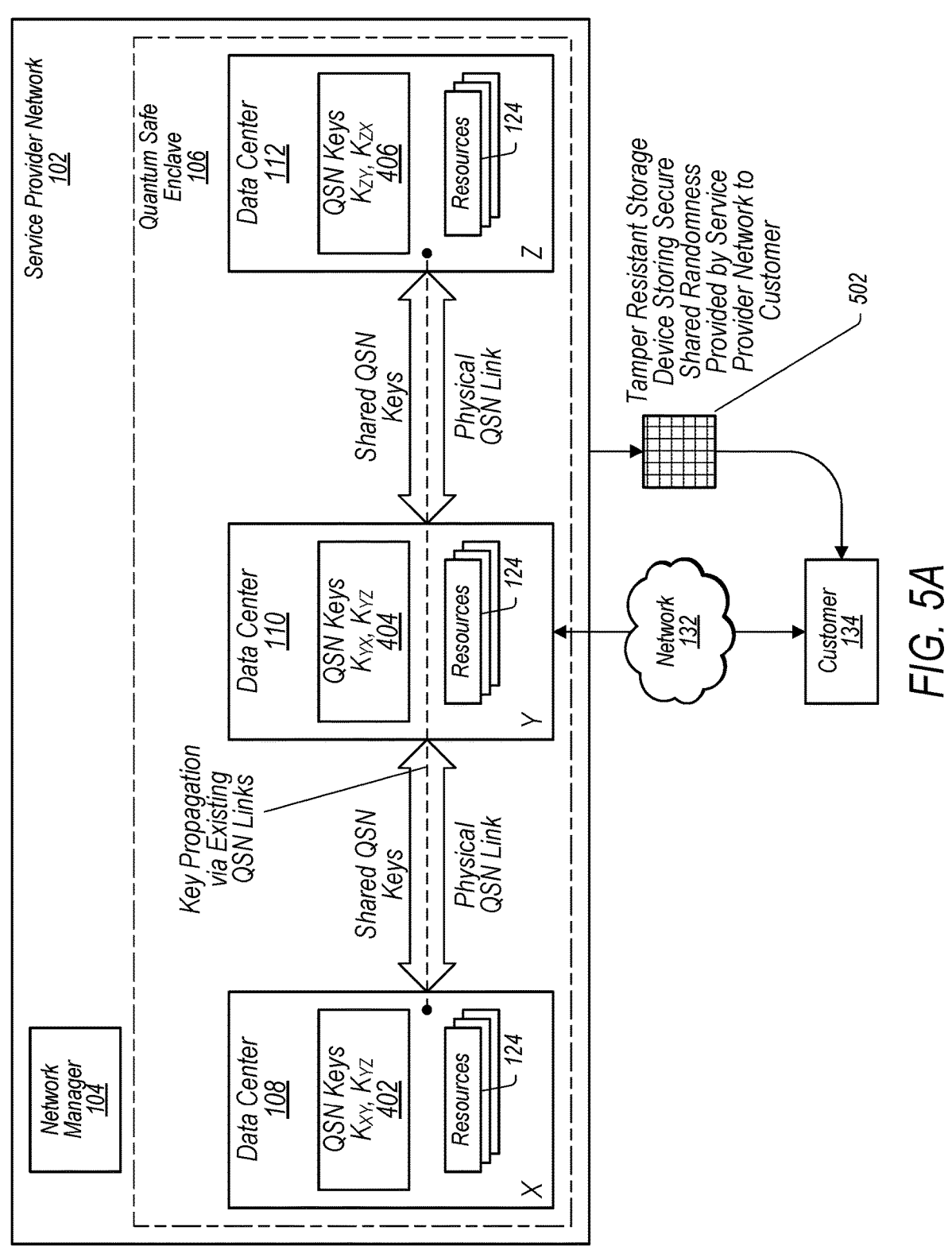
FIG. 5A illustrates another example of establishing a quantum safe network (QSN) link to a customer endpoint using a tamper-resistant storage device to distribute secure shared randomness to the customer for use in establishing the QSN link, according to some embodiments.

FIG. 5A illustrates another example of establishing a quantum safe network (QSN) link to a customer endpoint using a tamper-resistant storage device to distribute secure shared randomness to the customer for use in establishing the QSN link, according to some embodiments.

In some embodiments, as an alternative to establishing QKD links, a secure tamper-resistant storage device may be used to exchange secured shared randomness, e.g., encryption key material between parties. For example, in some embodiments, service provider network 102 may ship tamper-resistant storage device 502 to customer 134, wherein the tamper-resistant storage device 502 stores a fixed amount of secure shared randomness (known by service provider 102) that can be used as symmetric encryption key material to encrypt communications between customer 134 and quantum safe enclave 106.

Figure 5B:
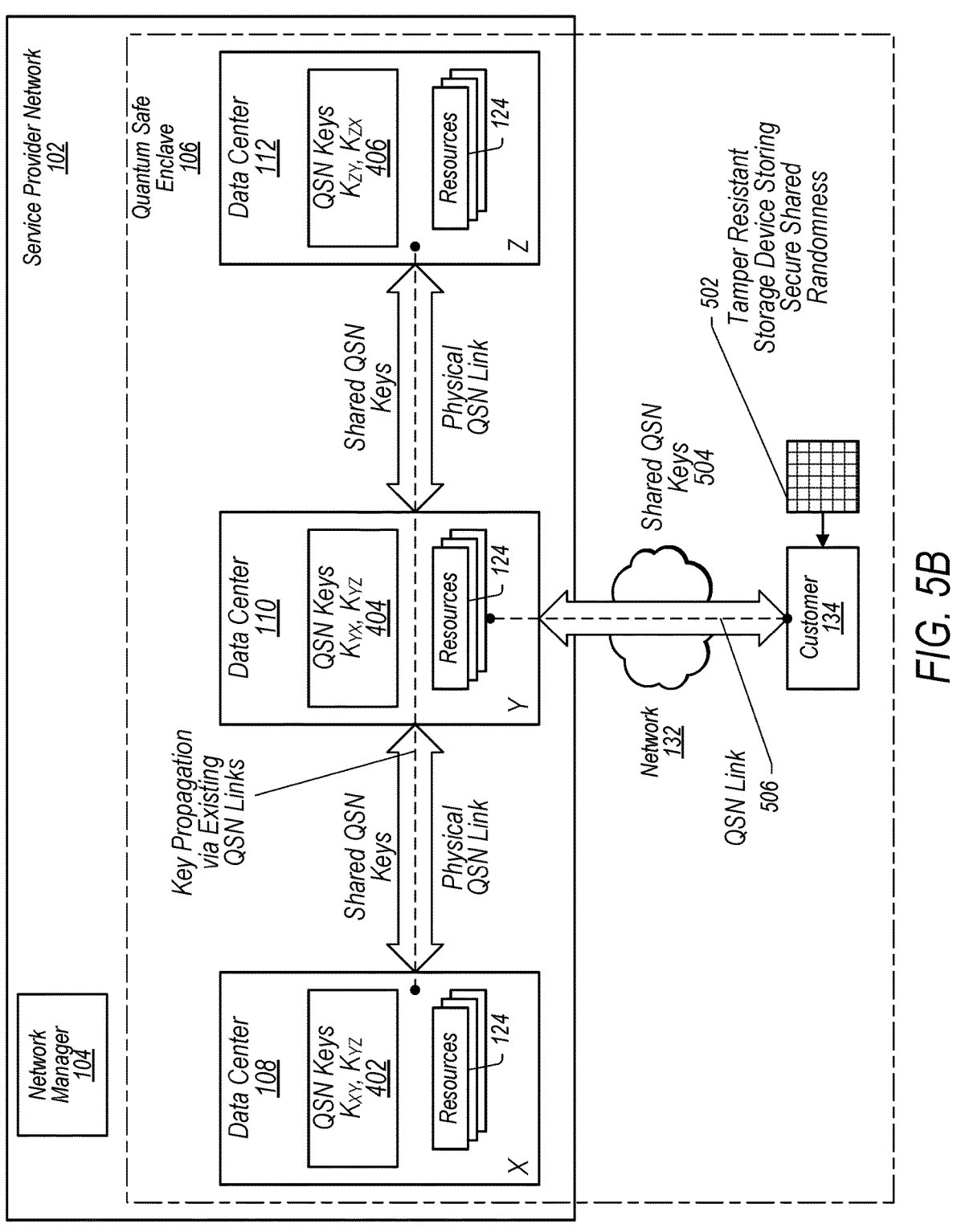
FIG. 5B illustrates a quantum safe enclave being extended to include a customer resource, wherein the customer has established a quantum safe network (QSN) link to a data center within the quantum safe enclave using secure shared randomness provided to the customer, according to some embodiments.

FIG. 5B illustrates a quantum safe enclave being extended to include a customer resource, wherein the customer has established a quantum safe network (QSN) link to a data center within the quantum safe enclave using secure shared randomness provided to the customer, according to some embodiments.

For example, as shown in FIG. 5B, quantum safe enclave 106 can be extended to include customer 134, by providing customer 134 shared secure randomness via tamper-resistant storage device 502. Thus, shared keys 504 generated from the shared secure randomness stored in tamper-resistant storage device 502 are used to establish QSN link 506 that extends quantum safe enclave 106 to include customer 134.

FIG. 6A illustrates an example tamper-resistant storage device that may be used to distribute secure shared randomness, according to some embodiments.

In some embodiments, a tamper-resistant data storage device 502 as described in FIG. 5 may include similar components as portable data transfer device 600 shown in FIGS. 6A-6D. In some embodiments, portable data transfer device 600 includes anti-tamper casing 602. Also, in some embodiments, a shippable data transfer device that includes an anti-tamper casing, such as data transfer device 600, may include separate chambers wherein a persistent storage medium is enclosed in a chamber surrounded by an anti-tamper casing, such as anti-tamper casing 602, and another chamber includes auxiliary components of the shippable data transfer device. The auxiliary components included in the other chamber may be components that need to be accessed more frequently, such as cooling components, power storage components, network interface components, user interface components, disk devices storing encrypted data, etc.

For example, data transfer device 600 includes chamber 604 surrounded by anti-tamper casing 602 that encloses persistent solid-state electrical mediums, such as solid-state memory devices or other types of non-volatile memory devices. Data transfer device 600 also includes chamber 606 that includes cooling systems 608 and may further include power storage devices (not shown), network interface connectors (not shown) and other auxiliary equipment that supports the persistent solid-state electronics devices enclosed in chamber 604. In some embodiments, a solid-state electronics chamber and an auxiliary chamber of a shippable data transfer device may be connected by a hardened conduit, such as conduit 610. In some embodiments, a hardened conduit, such as conduit 610, may include heat pipes that thermally connect the solid-state electronic devices of the solid-state electronics chamber, such as chamber 604, with the cooling systems of the auxiliary chamber, such as cooling system 608 of chamber 606. Additionally, in some embodiments, a hardened conduit between chambers, such as conduit 610, may include one or more wires, for example to supply power to the solid-state electronic devices of the storage chamber and/or to connect the solid-state electronic devices of the storage chamber to one or more network interfaces of the auxiliary chamber. As shown in FIG. 6A, a hardened conduit between chambers of a shippable data transfer device with an anti-tamper casing may include one or more lateral shifts through the frangible anti-tamper layer, such that there is not a straight path via the hardened conduit from the auxiliary chamber, such as chamber 606, to the solid-state electronics chamber, such as chamber 604. For example, the hardened conduit and the heat pipe(s) included therein may form a labyrinth or other non-straight path such that a compromised heat pipe does not provide a direct path circumventing the frangible anti-tamper layer into the solid-state electronics chamber, such as chamber 604. In some embodiments, electronic devices such as storage devices included in chamber 604 may be isolated with a gap separating both chambers to allow observation of all six sides of the solid-state electronics chamber from cooling systems and power supplies, such as may be included in chamber 606, other than a hardened conduit, such as conduit 610.

FIGS. 6B-6D illustrate example structures that may be used to provide tamper resistance for the tamper-resistant storage device used to distribute secure shared randomness, according to some embodiments.

In some embodiments, identifying elements and chemical pockets may be included in a same polymer matrix as illustrated in FIG. 6A. Or, in other embodiments, chemical pockets may be included in a first layer of an anti-tamper layer and identifying elements may be included in another layer of an anti-tamper layer. For example, anti-tamper layer 620 includes layers 622 and 626. Layer 622 incudes chemical pockets 624 in a polymer matrix of layer 622 and layer 626 includes identifying elements 628 in a polymer matrix of layer 626. In some embodiments, layers 622 and 626 may be made of different types of polymer. In some embodiments, identifying elements, such as identifying elements 628, may be reflective particles, colored particles, or colored patches. In some embodiments, any attempts to tamper with device 600 may cause the chemical pockets to be compromised setting off a reaction that disturbs identifying elements 628, thus providing an indication of tampering. In some embodiments, a service provider may capture a photo of the device 600 prior to shipping including in the picture a unique (e.g., random) arrangement of the identifying elements. Upon arrival at the customer, the customer may also capture a similar image and provide it to the service provider network. The service provider may use imaging software to determine that the unique pattern of the identifying elements is the same, thus indicating that the device has not been tampered with. The service provider may then provide acknowledgment to the customer that the device has been verified to be tamper free.

FIG. 6C illustrates another example anti-tamper layer, according to some embodiments. In some embodiments, an anti-tamper layer 640 may include a layer of identifying elements suspended in an electrical field. For example, layer 640 includes suspended identifying elements 644 suspended in layer 642. In some embodiments, entry of a foreign object, such as a drill bit, may disrupt the electrical field and cause the identifying elements 644 to be re-arranged. For example, in some embodiments, identifying elements may be charged particles suspended in the matrix in response to a particular voltage differential across the matrix. A breach of an anti-tamper casing may alter the voltage differential across the matrix causing the charged particles to be re-arranged. In some embodiments, an anti-tamper layer 620 may be included in an anti-tamper casing in addition to or in place of any of the other layers described herein.

FIG. 6D illustrates another example anti-tamper layer, according to some embodiments. In some embodiments, identifying elements may be included in a polymer material that is tension, wherein a foreign object, such as a drill bit, puncturing the layer causes the identifying elements included in the polymer material under tension to be re-arranged. For example, anti-tamper casing 660 includes a tensioned anti-tamper layer 662 stretched between two supports 664. In some embodiments, supports 664 may be coupled to a durable outer layer 670 and a shock-absorbent layer 668. In some embodiments, an anti-tamper layer 662 may be included in an anti-tamper casing in addition to or in place of any of the other layers described herein.

Note that FIGS. 6A-6D provide an example configuration of a tamper-resistant storage device that may be used to distribute secure shared randomness. However, in some embodiments, various other tamper-resistant storage device configurations may be used.

FIG. 7 is a flowchart illustrating a process of establishing and enforcing a quantum safe enclave, according to some embodiments.

At block 702, a service provider network establishes a quantum safe enclave for the service provider network or for a portion of the service provider network. This may be done by establishing QKD links or using a tamper-resistant storage device to distribute secure shared randomness, as described above. At block 704, the service provider network receives a request to move customer data within the quantum safe enclave. Then, at block 706, a network manager of the service provider network, such as network manager 104, permits the movement of the customer data in accordance with one or more policies established for the quantum safe enclave. The one or more policies limit transmission of the customer data in the quantum safe enclave to transmission via one or more quantum safe network links whose endpoints share securely distributed shared randomness used to encrypt communications via the one or more quantum safe network links. Also, at block 706, if there is not a quantum safe network link available, the network manager of the service provider network, such as network manager 104, may not permit the movement of the customer data because the one or more policies regarding the quantum safe enclave cannot be complied with.

FIG. 8 is a flowchart illustrating additional details regarding a process for establishing a quantum safe enclave, according to some embodiments.

In some embodiments, establishing the quantum safe enclave comprises, at block 802, distributing secure shared randomness to endpoints using links sharing a quantum connection (e.g. a QKD link), or using other secure means such as a tamper resistant storage device storing secure randomness to be shared, and at block 804 encrypting communications to be sent between the endpoints using the secure shared randomness. In some embodiments, the secure shared randomness may be used to encrypt the communications using a one-time pad. Also, in some embodiments, other symmetric encryption protocols may be used.

Figure 9:
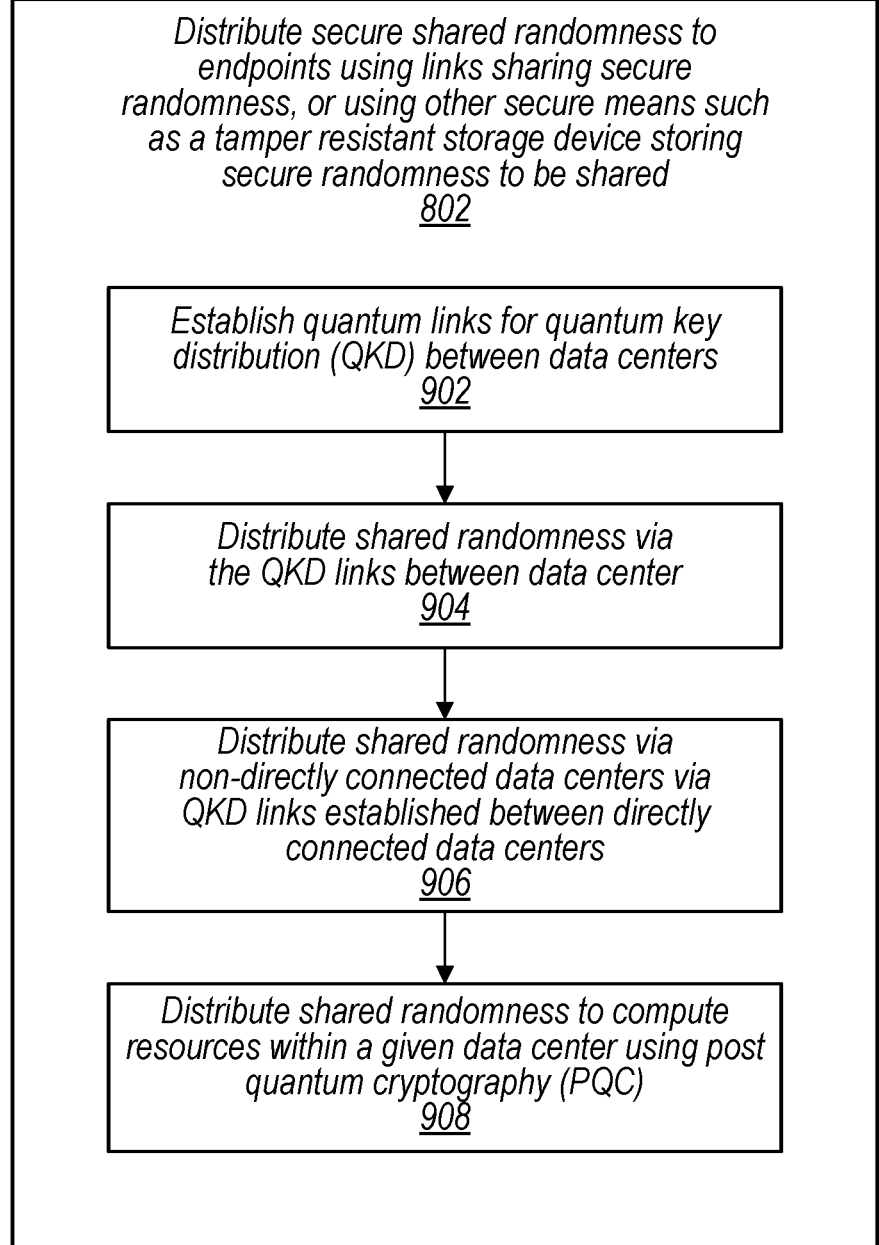
FIG. 9 is a flowchart illustrating additional details regarding an example process for distributing secure shared randomness in order to establish a quantum safe enclave, according to some embodiments.

FIG. 9 is a flowchart illustrating additional details regarding an example process for distributing secure shared randomness in order to establish a quantum safe enclave, according to some embodiments.

In some embodiments, distributing secure shared randomness includes process steps as shown in FIG. 9. For example, at block 902, quantum entangled links are established between data centers of a service provider network. At block 904, secure shared randomness is distributed between the data centers via the established QKD links. Then at block 906, secure shared randomness is distributed between non-directly connected data centers (e.g., data centers without a physical QKD link connecting them directly) via the established QKD links using the already distributed shared randomness to encrypt the distribution of the secure shared randomness to the non-directly connected data centers. Then, at block 908, within the respective data centers, post quantum cryptography (PQC) is used to distribute encryption keys to individual resources within the respective data centers.

FIG. 10 is a flowchart illustrating additional details regarding another example process for distributing secure shared randomness in order to establish a quantum safe enclave, according to some embodiments.

In some embodiments, distributing the secure shared randomness comprises, for example at block 1002, securely distributing shared randomness between endpoints using a tamper resistant storage device delivered to at least one of the endpoints, wherein the tamper respondent storage device stores a copy of shared randomness held by the other endpoint.

FIG. 11 is an example flow diagram for a process of providing customer access to a quantum safe enclave, according to some embodiments.

In some embodiments, a service provider network may offer quantum safe communications as an optional feature that a customer may select. For example, a customer may specify that the customer's data is to be restricted to a quantum safe enclave. For example, at block 1102, the service provider network may receive a request from a customer to include resources provisioned to the customer in a quantum safe enclave. Also, at block 1104, the service provider network may provision resources to the customer on computing devices located within a quantum safe enclave.

FIG. 12 is an example flow diagram for another process of providing customer access to a quantum safe enclave, according to some embodiments.

In some embodiments, a service provider network may upgrade to support quantum safe communications in a manner that is transparent to customers. For example, at block 1202, the service provider network may determine to upgrade security to provide quantum safe security to customers. Then, at block 1204, the service provider network may upgrade links between data centers to include quantum safe network links. Additionally, at block 1206, the service provider network may automatically transition resources provisioned to customers of the service provider network to be included in one or more quantum safe enclaves of the service provider network.

Illustrative Computer System

Figure 13:
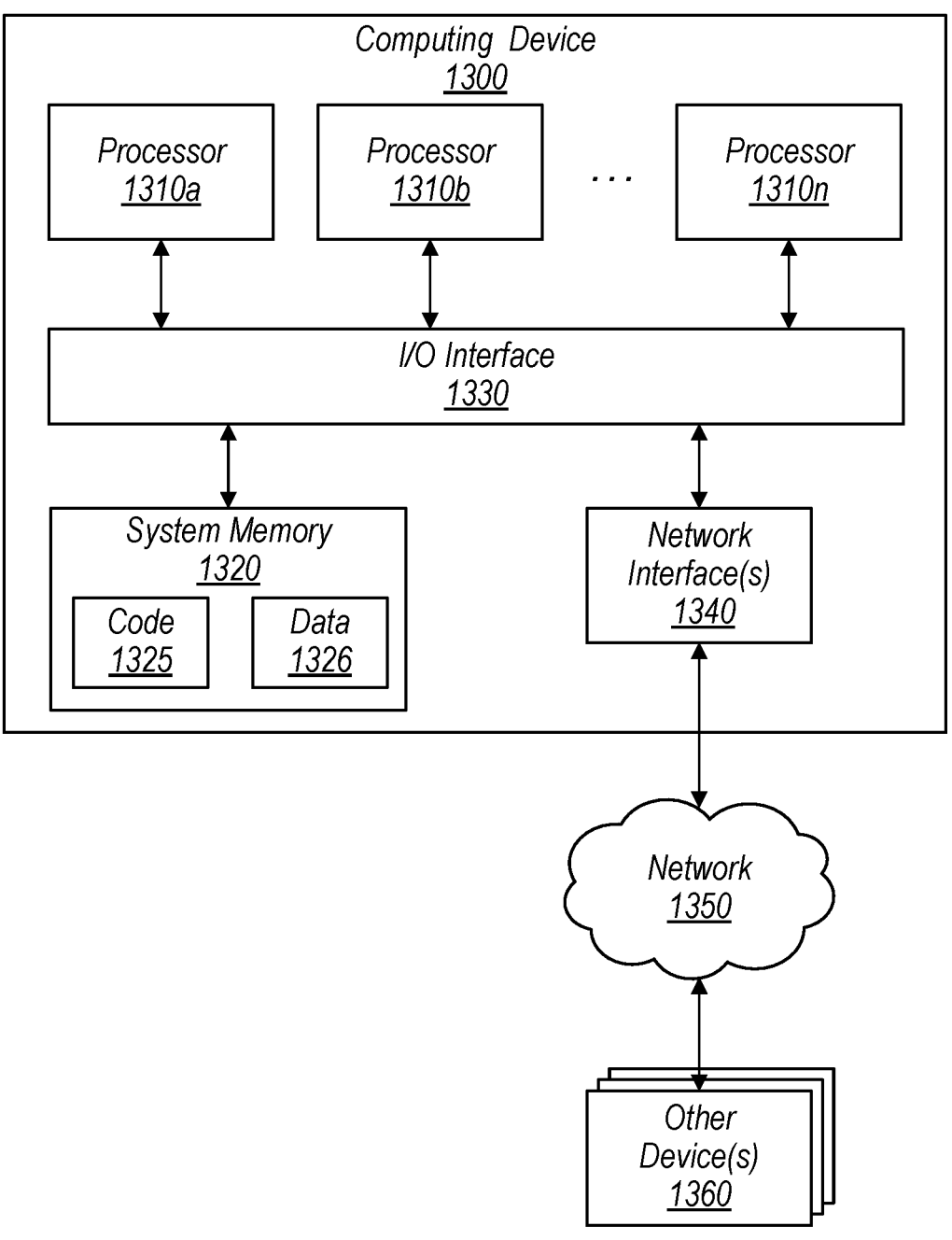
FIG. 13 is a block diagram illustrating an example computing device that may be used in at least some embodiments.

FIG. 13 illustrates such a general-purpose computing device 1300 as may be used in any of the embodiments described herein. In the illustrated embodiment, computing device 1300 includes one or more processors 1310 coupled to a system memory 1320 (which may comprise both non-volatile and volatile memory modules) via an input/output (I/O) interface 1330. Computing device 1300 further includes a network interface 1340 coupled to I/O interface 1330.

In various embodiments, computing device 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA. In some implementations, graphics processing units (GPUs) may be used instead of, or in addition to, conventional processors.

System memory 1320 may be configured to store instructions and data accessible by processor(s) 1310. In at least some embodiments, the system memory 1320 may comprise both volatile and non-volatile portions; in other embodiments, only volatile memory may be used. In various embodiments, the volatile portion of system memory 1320 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1320 as code 1325 and data 1326.

In some embodiments, I/O interface 1330 may be configured to coordinate I/O traffic between processor 1310, system memory 1320, and any peripheral devices in the device, including network interface 1340 or other peripheral interfaces such as various types of persistent and/or volatile storage devices. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computing device 1300 and other devices 1360 attached to a network or networks 1350, such as other computer systems or devices as illustrated in FIG. 1 through FIG. 12, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may represent one embodiment of a computer-accessible medium configured to store at least a subset of program instructions and data used for implementing the methods and apparatus discussed in the context of FIG. 1 through FIG. 12. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1300 via I/O interface 1330. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1300 as system memory 1320 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 1340. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a plurality of computing devices of a service provider network configured to allocate a quantum safe enclave to a customer of the service provider network, wherein the quantum safe enclave comprises one or more computing resources provisioned as a virtualized computing instance or a bare metal computing instance for use by the customer;

a plurality of quantum safe network links within the quantum safe enclave, wherein respective ones of the computing devices connected to the quantum safe network links store securely distributed secure shared randomness used to encrypt communications transmitted via the quantum safe network links; and one or more different computing resources external to the quantum safe enclave configured to implement a network manager configured to:

enforce one or more policies that limit communications between the computing resources allocated for use by the customer and operated on behalf of the customer within the quantum safe enclave to transmission via respective ones of the quantum safe network links.

2. The system of claim 1, wherein:

the plurality of computing devices of the service provider network are included in two or more data centers, the quantum safe network links connect the two or more data centers;

at least one of the quantum safe network links passes through a trust free region not controlled by the service provider network; and the one or more different computing resources configured to implement the network manager are further configured to:

cause the secured shared randomness to be distributed for use in establishing the quantum safe network links, wherein the secure shared randomness is distributed in a way that provides a security or privacy guarantee for the secured shared randomness when passing through the trust free region.

3. The system of claim 2, further comprising:

computing devices in the respective two or more data centers that are configured to:

perform quantum key distribution (QKD) between connected data centers in order to establish the quantum safe network links.

4. The system of claim 3, wherein the network manager is further configured to:

encrypt communications within a given data center within the quantum safe enclave between a destination or source computing device in the given data center and an associated quantum safe network link connected to the given data center, wherein said encryption within the given data center is performed using a post quantum cryptography (PQC) encryption protocol.

5. The system of claim 1, wherein the quantum safe enclave comprises computing resources implemented on the computing devices of the service provider network included in three or more data centers, and wherein the network manager is further configured to:

perform quantum key distribution (QKD) between data centers connected via respective network links in order to establish the quantum safe network links via the respective network links, wherein the quantum safe network links established via quantum key distribution are QKD links; and perform an encryption key encapsulation operation to distribute the secure shared randomness between computing devices, in data centers that are connected to one another via the QKD links, to an intermediate data center.

6. A method, comprising:

provisioning, as a virtualized computing instance or a bare metal computing instance, computing resources of a service provider network to be allocated as a quantum safe enclave for use by a customer of the service provider network;

receiving a request to move data, between the computing resources allocated for use by the customer, within the quantum safe enclave; and enforcing, using one or more different computing resources, one or more policies that limit transmission of data within the quantum safe enclave between the computing resources allocated for use by the customer to transmission via one or more quantum safe network (QSN) links whose endpoints share securely distributed shared randomness used to encrypt communications transmitted via the one or more quantum safe network links.

7. The method of claim 6, further comprising:

establishing quantum key distribution (QKD) links between data centers of the service provider network; and distributing the shared randomness via the QKD links.

8. The method of claim 7, further comprising:

distributing the shared randomness between a first data center and a third data center using encryption key encapsulation, wherein a first QKD link connects the first data center to a second intermediate data center and a second QKD link connects the second intermediate data center to the third data center.

9. The method of claim 7, further comprising:

distributing the shared randomness to computing devices within respective ones of the two or more data centers, wherein the shared randomness is distributed between the two or more data centers via the QKD links, and wherein the shared randomness is distributed within the respective ones of the data centers between a QKD link and a computing device using, in the respective data center, a post quantum cryptography (PQC) encryption protocol.

10. The method of claim 9, further comprising:

encrypting communications using the shared randomness over a public or shared communication link, wherein said encrypting is based on symmetric encryption keys generated using the shared secure randomness.

11. The method of claim 10, wherein the encrypted communications over the public or shared communication link comprise one or more of:

virtual private network (VPN) communications;

internet protocol security (IPSec) communications;

media access control security (MacSec) communications; or transport layer security (TLS) communications.

12. The method of claim 6, further comprising:

distributing the shared randomness to a computing device in a customer network, external to the service provider network; and establishing a QSN link between the computing device in the customer network and the service provider network using the distributed shared randomness such that the computing device in the customer network is included in the quantum safe enclave.

13. The method of claim 6, wherein distributing the shared randomness to the computing device in the customer network comprises:

distributing the shared randomness to a customer using a tamper-resistant storage device; and wherein said establishing the quantum safe network (QSN) link comprises:

encrypting communications between computing devices in the service provider network and the computing device in the customer network using the shared randomness.

14. The method of claim 6, further comprising:

distributing quantum entanglement between endpoints included in the quantum safe enclave; and distributing the shared randomness via the distributed quantum entanglement.

15. The method of claim 6, further comprising:

receiving a request from a customer of the service provider network to include resources provisioned to the customer in a quantum safe enclave; and in response to receiving the request, allocating resources to the customer implemented on computing devices included in the quantum safe enclave.

16. The method of claim 6, further comprising:

upgrading links between data centers comprising computing devices that host resources provisioned to the customer of the service provider network to be QSN links; and automatically transitioning the resources provisioned to the customer to be included in the quantum safe enclave.

17. The method of claim 16, wherein said automatically transitioning the resources provisioned to the customer to be included in the quantum safe enclave comprises:

enforcing the one or more policies to limit transmission of the customer's data to transmission via QSN links.

18. One or more non-transitory, computer-readable media, storing program instructions, that when executed on or across one or more processors, cause the one or more processors to:

provision, as a virtualized computing instance or a bare metal computing instance, computing resources of a service provider network to be allocated as a quantum safe enclave for use by a customer of the service provider network, wherein the computing resources are separate from the one or more processors;

receive a request to move data, between the computing resources allocated for use by the customer, within the quantum safe enclave; and enforce one or more policies that limit transmission of data between the computing resources allocated for use by the customer within the quantum safe enclave to transmission via one or more quantum safe network links whose endpoints share securely distributed shared randomness used to encrypt communications transmitted via the one or more quantum safe network links.

19. The one or more non-transitory, computer-readable media of claim 18, wherein the program instructions, when executed on or across the one or more processors, further cause the one or more processors to:

cause quantum key distribution (QKD) links to be established between elements of the service provider network using quantum devices included in the elements of the service provider network; and securely distribute the shared randomness via the QKD links.

20. The one or more non-transitory, computer-readable media of claim 19, wherein the program instructions, when executed on or across the one or more processors, further cause the one or more processors to:

receive a request from a customer to include a customer endpoint in the quantum safe enclave;

cause, in response to the request, a QKD link to be established between a quantum device of the service provider network and a quantum device located at the customer endpoint; and securely distribute the shared randomness to the customer endpoint via the established QKD link to the customer endpoint.

* * * * *